(12) United States Patent
Cyran et al.

(10) Patent No.: US 6,412,107 B1
(45) Date of Patent: Jun. 25, 2002

(54) METHOD AND SYSTEM OF PROVIDING DYNAMIC OPTIMIZATION INFORMATION IN A CODE INTERPRETIVE RUNTIME ENVIRONMENT

(75) Inventors: Robert J. Cyran, Delmont; Paul J. Knueven, Pittsburgh, both of PA (US); Jonathan H. Shiell, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/256,906

(22) Filed: Feb. 24, 1999

Related U.S. Application Data

(60) Provisional application No. 60/076,173, filed on Feb. 27, 1998.

(51) Int. Cl.[7] .................................................. G06F 9/45
(52) U.S. Cl. ............................................ 717/148; 717/151
(58) Field of Search ................................. 717/5, 6, 7, 8, 717/9; 703/26, 27; 7117/139, 118, 138, 146, 148, 151, 154

(56) References Cited

U.S. PATENT DOCUMENTS

| | | | | |
|---|---|---|---|---|
| 5,999,737 A | * | 12/1999 | Srivastava | 395/709 |
| 6,101,325 A | * | 8/2000 | Flaat | 395/705 |
| 6,110,226 A | * | 8/2000 | Bothner | 717/7 |
| 6,151,618 A | * | 11/2000 | Wahbe et al. | 709/1 |

OTHER PUBLICATIONS

Proebsting, "Optimizing an ANSI C interpreter with super-operators", POPL '95, ACM, 1995, pp 322–327.*
Quinnell, "Java perks up embedded systems", EDN, Aug. 1997, pp 38–49.*
Bothner, "A Gcc–based Java Implementation", IEEE, 1997, pp 174–178.*
"Compiling Java Just In Time", Cramer, et al., Sun Microsystems, Inc., *IEEE Micro*, 1997, pp. 36–43.
"236: Developing JavaRun–Time Applications", Bothner, Class 236, Embedded Systems Conference, Cygnus Solutions, 16 pages.
"Optimizing NET Compilers for Improved Java Performance", Hsueth, et al., *IEEE*, Jun. 1997, pp. 67–75.

* cited by examiner

*Primary Examiner*—Kakali Chaki
(74) *Attorney, Agent, or Firm*—Pedro P. Hernandez; W. James Brady, III; Frederick J. Telecky, Jr.

(57) ABSTRACT

The present invention is a code preparation system (12) which accepts input code (11) in intermediate code format, our source code format which is first translated into intermediate format, analyzes the intermediate code, then provides optimization information, hints, and/or directions (collectively referred to as "optimization information") for optimizing execution of the intermediate code by a code interpretive runtime environment, such as a Java Virtual Machine. The code interpretive runtime environment is operable to selectively implement the optimization information received from the code preparation system (12). The optimization information is provided to the code interpretive runtime environment in the form of additional attributes added to a class file (14) generated by the code preparation system (12). Processing in accordance with the received optimization information allows the code interpretive runtime environment to execute code more efficiently and to manage use of its resources more effectively, particularly when executing in a limited resource computing environment. Such limited resource computing environments include set-top boxes, digital personal assistants, etc.

4 Claims, 2 Drawing Sheets

METHOD AND SYSTEM OF PROVIDING DYNAMIC OPTIMIZATION INFORMATION IN A CODE INTERPRETIVE RUNTIME ENVIRONMENT

This amendment claims priority under 35 USC § 119(e)(1) of provisional application No. 60/076,173, filed Feb. 27, 1998.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This invention relates to code interpretive virtual machines and in particular to a method and system for providing optimization information to the code interpretive virtual machine.

BACKGROUND OF THE INVENTION

This invention is related to U.S. patent application Ser. No. 08/990,040 which is herein incorporated by reference in its entirety.

Code interpretive runtime systems, such as a Java Virtual Machine (JVM), which execute intermediate code in an interpretive mode are specially useful in embedded, real-time applications. In exchange for speed of execution provided by compiled code which is executable only on the specific platform it was compiled for, the intermediate code is extremely portable and executable on any platform by a JVM designed specifically for that platform.

To improve performance, the JVM generally also includes a "Just-In-Time" ("JIT") compiler for compiling the intermediate code under certain conditions, i.e., when repeated use of the same sequence of intermediate code is detected. The JVM may also be designed to optimize the intermediate code before execution. While these enhancements to the code interpretive runtime systems do provide some performance improvements, the overhead associated with making such compilation and/or optimization decisions on-the-fly can far outweigh the resulting benefits, particularly in real time applications executing in a limited resource environment.

What is needed is a method of providing optimization information to the code interpretive runtime system to assist it in executing code more effectively and in managing use of its limited resources more effectively.

SUMMARY OF THE INVENTION

The present invention is a code preparation method and system which provide optimization information to a code interpretive runtime environment operating on a first data processing platform. The code preparation system partially compiles code input on a second data processing platform to generate intermediate code or accepts as input preprocessed intermediate code, analyzes the intermediate code on the second data processing platform, then generates optimization information for optimizing further processing of the intermediate code in response to the analysis. The intermediate code and the generated instructions are provided to the code interpretive runtime environment operating on the first data processing platform. The code interpretive runtime environment is operable to use the instructions to further process the intermediate code on the first data processing platform.

The code preparation system of the present invention thus allows the code interpretive runtime environment to process the code more efficiently and to manage use of its resources more effectively, particularly when executing in a limited resource computing environment. Such limited resource computing environments include set-top boxes, digital personal assistants, etc.

In another aspect of the invention, the code interpretive runtime system is operable to selectively implement the optimization instructions in accordance with its features and those of the computing platform on which it is executing.

In another aspect of the present invention, the further processing of the intermediate code on the first data processing platform includes completing the compilation started by the code preparation system.

In yet another aspect of the invention, the optimization information is provided to the code interpretive runtime system as attributes added to class files.

These and other features of the invention that will be apparent to those skilled in the art from the following detailed description of the invention, taken together with the accompanying drawings.

DETAILED DESCRIPTION OF THE INVENTION

Figure 1:
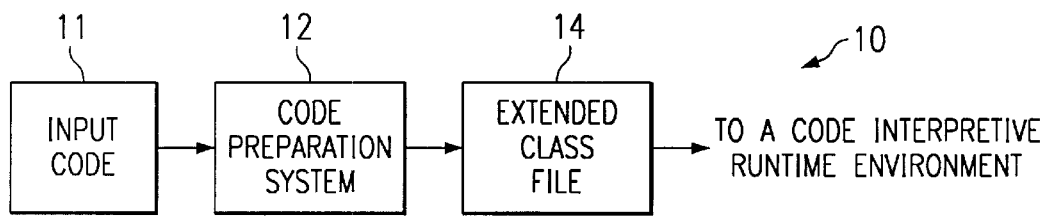
FIG. 1 is block diagram of the code preparation system of the present invention.

As illustrated in FIG. 1, the present invention is a code preparation system 12 which accepts as input pre-processed code 11, analyzes the results, and then provides a code interpretive runtime environment, such as a Java Virtual Machine ("JVM") if the input code is Java intermediate code, with optimization information, hints, and/or directions (collectively referred to as "optimization information") to use in further processing of the intermediate code. The input code 11 may also be source code, such as Java source code, which is first translated into intermediate code format before being analyzed. The optimization information it provided as additional attributes added to class files 14 generated by the code preparation system 12. It is contemplated that the code preparation system 12 operates on a resource rich computing environment, i.e., has enough space and time resources to effectively implement the optimizations. Thus, by further processing in accordance with the optimization information provided by the code preparation system 12, the code interpretive runtime environment is able to execute the intermediate code more efficiently and to manage its own resources more effectively particularly when executing in a limited resource computing environment. Such limited resource computing environments include set-top boxes, digital personal assistants, etc.

In describing the preferred embodiment of the present invention hereinbelow, it is assumed that the input code 11 is Java source code or bytecodes, and that the intermediate code generated by the code preparation system 12 when the input code 11 is Java source code is Java bytecodes although any other code interpretive language may also make use of the features of the present invention. The Java bytecodes generated by the code preparation system 12 are included, along with the generated optimization information, in the extended class file 14. Note that the extended class file 14 may be a fat class, which includes both native code and Java byte codes. The extended class file 14 may also be an obese class which includes, in addition to the native code and Java byte codes, attributes which describe the optimization information generated by the code preparation system 12.

All attribute structure definitions follow the same C-like structure used in the "Java Virtual Machine Specification" by Tim Lindholm and Frank Yellin (hereinafter referred to as the "JVM Specification"). The general format (where u1, u2, and u4 are used to represent a one, two, or four byte unsigned quantity, respectively) is as follows:

```
attribute_info {
    u2 attribute_name_index;
    u4 attribute_length;
    u1 info[attribute_length];
}
``` where "attribute_info" identifies the particular attribute; "attribute_name_index" and "attribute_length".

In addition, all newly defined attributes follow the naming conventions specified in the JVM Specification. As an example, new attributes defined by the assignee, Texas Instruments, have an attribute name of the form:

"COM.TexasInstruments.new-attribute".

This naming convention prevents the new attributes from accidentally conflicting with new attributes defined by other companies.

The extended class file 14 created by the code preparation system 12 is executed by a code interpretive runtime environment, such as the JVM, whether or not the JVM recognizes the attributes generated by the code preparation system 12 or not. In other words, adding these new attributes to the Java class file does not prohibit the class from executing on a JVM that does not recognize the new attributes. This is because the JVM ignores any unrecognized attributes. Since addition of the new attributes does not affect the semantics of the original class, ignoring the attributes has no ill-effects. Of course, JVMs which do recognize and support the new attribute are able to use them in the intended fashion and to take advantage of the additional information provided.

Figure 2:
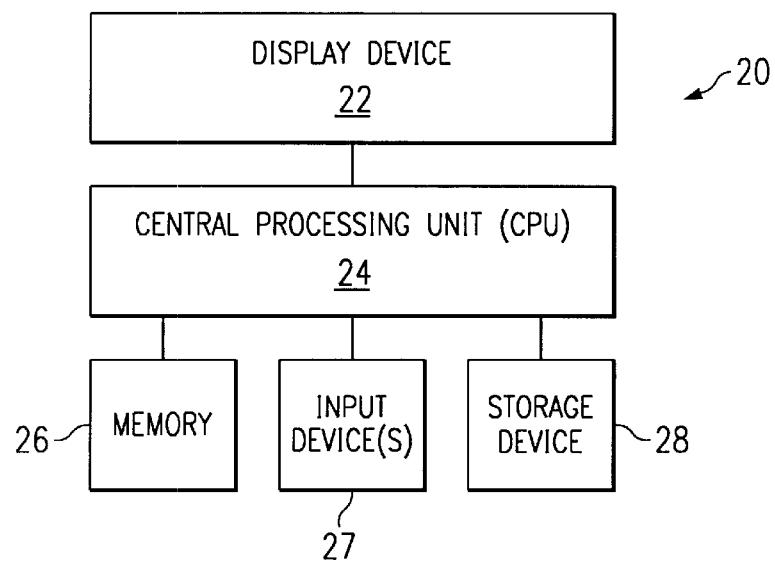
FIG. 2 illustrates a general purpose computer on which the code preparation system of the present invention operates.

Referring to FIG. 2, the code preparation system 12 of the present invention executes on a general purpose computer, i.e. a personal computer (PC) or workstation, such as that shown in FIG. 2 which includes a central processing unit 24, a memory 26, an input device 27, a storage device 28, and a display device 22. The input device 27 includes devices such as a keyboard or mouse.

Figure 3:
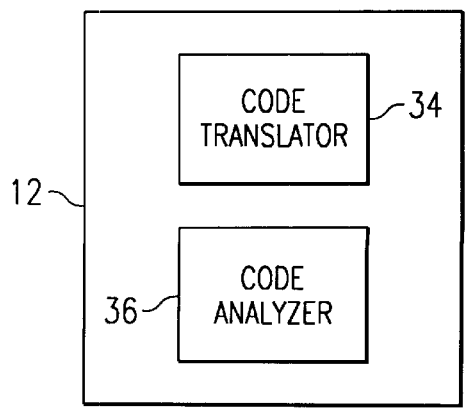
FIG. 3 shows a detailed block diagram of the code preparation system of the present invention.

Referring to FIG. 3, a detailed block diagram of the code preparation system 12 is shown. The code preparation system 12 includes a code translator 34 and a code analyzer 36. Operation of each of these components will be discussed in detail hereinbelow with respect FIG. 4.

Figure 4:
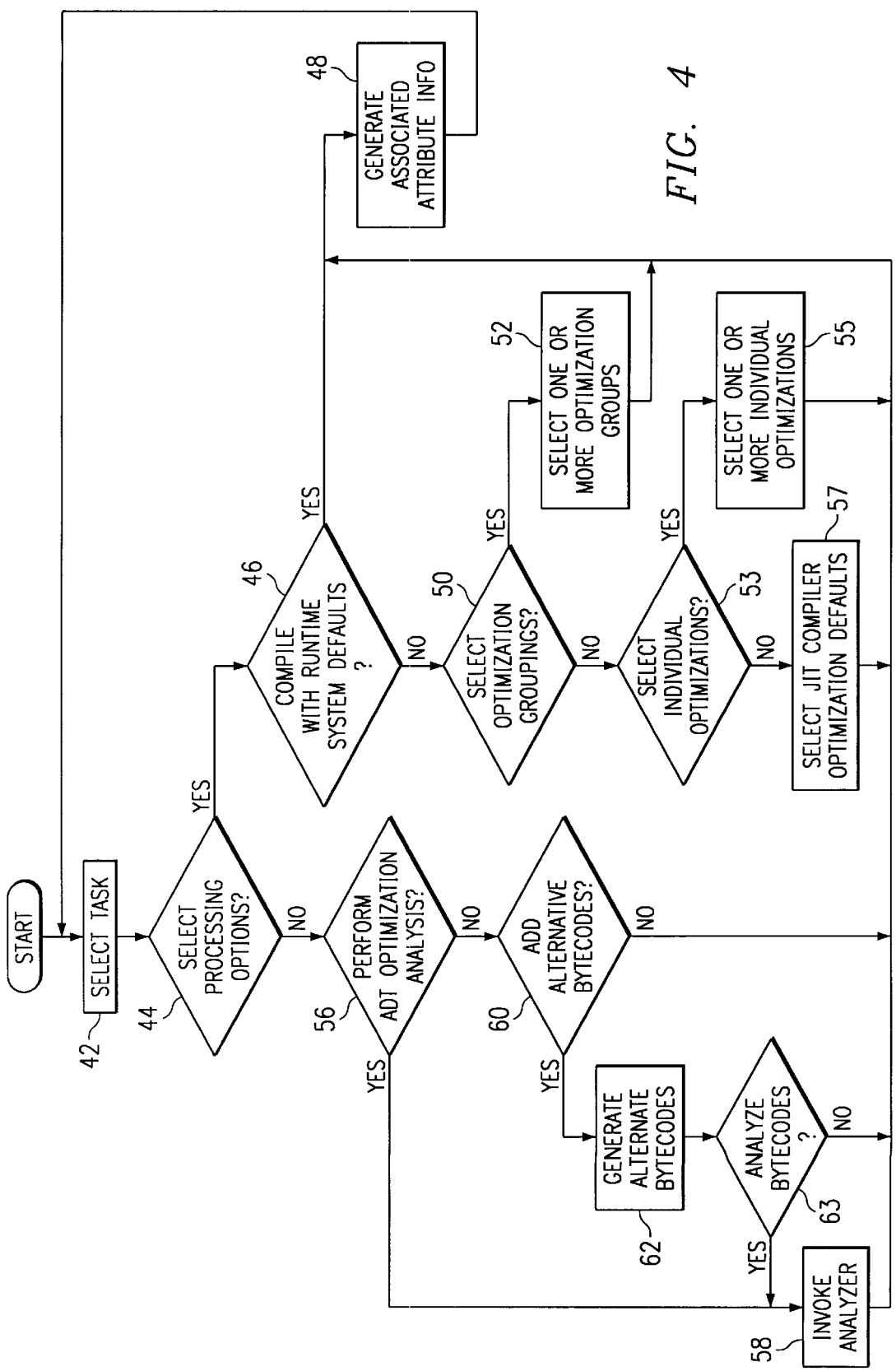
FIG. 4 is a flow diagram illustrating operation of the code preparation system of the present invention.

FIG. 4 shows a flowchart which illustrates operation of the code preparation system 12. Starting at block 42, the user interface provides the user with the ability to select a task from among those provided by the code preparation system 12. If, at decision block 44, if the user chooses to select processing options to guide further processing of the intermediate code by the code interpretive runtime system, processing proceeds at decision block 46 where the user may choose to have the code interpretive runtime system, i.e., the JVM, invoke its JIT compiler with optimization information generated by the code interpretive runtime system. The associated attribute information is then generated at block 48.

If, at decision block 46, the user chooses not to have the code interpretive runtime system invoke the JIT compiler with its own defaults, operation continues at decision block 50. If, at decision block 50, the user chooses to select from groupings of optimizations to be provided to the JIT compiler, processing continues at block 52 where one or more of the optimization groupings are selected. Processing then continues at block 48 where the associated attribute information is generated. If, at decision block 50, the user chooses not to select from groupings of the available optimizations, processing continues at decision block 53.

At decision block 53, the user has the option of selecting from individual optimizations. If, at decision block 53, the user elects to choose individual optimizations, processing continues at block 55 where the user chooses one or more of the available optimizations. Processing then continues at block 48 where the associated attribute information is generated. If, at decision block 53, the user does not select the option to choose from individual optimizations, processing continues at block 57 where instructions to the code interpretive runtime system to invoke the JIT compiler using the defaults set in the JIT compiler are selected. Operation then continues at block 48 where the associated attribute information is generated.

As an example, when the user elects to have the code interpretive runtime system invoke the JIT compiler with the defaults set in the JIT compiler, the attribute "COM.TexasInstruments.JIT" is used to pass information related to invoking the JIT compiler to the code interpretive runtime system. This attribute can be a sub-attribute of the predefined "Code" attribute. The general format is:

```
COM.TexasInstruments.JIT {
    u2 attribute_name_index;
    u4 attritute_length;       /* not including first 6-bytes */
    u2 attributes_count;
    attribute_info attributes[attributes_count];
}
```

The presence of this attribute in the class file 14 informs the Java runtime system to JIT compile the intermediate codes for the method that includes the "Code" attribute. In addition, the COM.TexasInstruments.JIT attribute is also used to pass optimization information generated by the code preparation system 12 or directions to the JIT compiler instructing it to perform its own optimizations at compile time, as discussed hereinabove.

For these latter two cases, the extra information is passed as sub-attributes of the attribute COM.TexasInstruments.JIT.

In its simplest form, the COM.TexasInstruments.JIT attribute informs the Java runtime system to JIT compile using its own default settings. In which case the attribute format is:

```
COM.TexasInstruments.JIT {
    u2 attribute_name_index;
    u4 attritute_length;           /* 2 */
```

```
                u2 attributes_count;               /* 0 */
            }
``` where there are no sub-attributes. Note that the sub-attribute "attribute_length" always has a value of two (2) in this case indicating the two bytes which follow for the sub-attribute "attributes_count". The value of the sub-attribute "attributes_count" in this case is always zero (0).

In a second example, additional optimization information may also be passed to the code interpretive runtime system by adding sub-attribute information to the compilation attribute. As in the first example, the compilation attribute informs the runtime system to JIT compile the intermediate code for the particular method. With the additional of sub-attribute information, it may also inform the JIT compiler to perform optimizations such as instruction scheduling and peephole optimizations on the native code that it generates. In this case, a sub-attribute, COM.TexasInstruments.JITOptimizations, is added to the COM.TexasInstruments.JIT attribute. This then gives us:

```
COM.TexasInstruments.JIT {
    u2 attribute_name_index;
    u4 attritute_length;                  /* 2 + size of        */
                                          /* COM.TexasInstruments.JITOptimizations */
    u2 attributes_count;                  /* 1 */
    attribute_info attributes[attributes_count];
                                          /* COM.TexasInstruments.JITOptimizations */
}
``` where the attributes_count is 1 and the sub-attribute follows the count. The format of the COM.TexasInstruments.JITOptimizations attribute is:

```
COM.TexasInstruments.JITOptimizations {
    u2 attribute_name_index;
    u4 attritute_length;        /* always 2 */
    u2 optimization_mask;
}
```

Here the two byte unsigned integer field "optimization-mask" indicates which optimizations the JIT compiler is to perform. A predefined set of optimizations is established where each optimization is given a value, for example from 0–15. Setting a corresponding bit in the "optimization_mask" field informs the JIT compiler to perform that particular optimization. As an example, assume the following predefined set of optimizations:

|  |  |
|---|---|
| instruction scheduling | –0 |
| loop alignment | –1 |
| peephole opts. | –2 |
| ... |  |
| unused | –15 |

To inform the JIT compiler that it should perform instruction scheduling and peephole optimizations, the "optimization_mask" field is set to 5 (i.e., 101 in binary). If more than sixteen (16) optimizations are available, the size of the optimization_mask is increased to more than the 2-bytes shown hereinabove.

The code preparation system of the present invention provides developers with an interface that allows them to select these individual optimizations. In addition, the tool also provides a general interface which, for example, allows developers to invoke the JIT compiler at low, medium, or high optimization, or to select a pre-defined set of speed or space optimizations. However, under the floor, these field settings can still be transformed into the attribute COM.TexasInstruments.JITOptimizations as described hereinabove, where each of these more general levels of optimization performs zero or more of the individual optimizations described hereinabove. In other words, this more general interface is provided for convenience.

Returning to FIG. 4, if, at decision block 44, the user does not choose to select processing options, operation continues at decision block 56 where the user may choose to perform optimization analysis on the input code 11. If selected, operation continues to block 58 where the code analyzer 36 is invoked to pre-process, i.e., pre-compile the input code.

In one aspect of the invention, optimization information generated by the code preparation system 12 is provided to the JIT compiler, not shown, which is part of the code interpretive runtime environment and is operable to generate native code in accordance with this optimization information. The generation of the optimization information, which may require significant resources, i.e., in terms of both processing time and system memory, is performed ahead-of-time (AOT) by the code preparation system 12. The code preparation system 12 operates, relatively speaking, irrespective of time and in a computing environment which generally has more resources at its disposal than those available to the computing environment in which it is contemplated that the code interpretive runtime system operates.

The JIT compiler, which operates in the contemplated limited resource environment of the code interpretive runtime system and whose execution speed is always critical to an application's performance, then uses this pre-computed optimization information to operate optimized native code. Therefore, the method of separating compilation in accordance with the present invention allows the JIT compiler to incorporate costly optimizations into its code generation process without actually incurring any of the resource-related expense that would otherwise be required if the separation was not done. This further allows the JIT compiler to continue operating within the stricter confinements imposed by its limited resource operating environment.

Thus, in the following example, information about local variable register binding is passed to the JIT compiler. In this case, the code preparation system 12 analyzes the intermediate code using the code analyzer 36 and then passes the resulting optimization information to the JIT compiler.

To pass the register binding information, the attribute COM.TexasInstruments.JITLocalBindings is passed as a sub-attribute of the attribute COM.TexasInstruments.JIT.

This gives us:

```
COM.TexasInstruments.JIT {
  u2 attribute_name_index;
  u4 attribute_length;                /* 2 + size of        */
                                      /* COM.TexasInstruments.JITLocalBindings */
  u2 attributes_count;                /* 1 */
  attribute_info attributes[attributes_count];
                                      /* COM.TexasInstruments.JITLocalBindings */
}
``` where the attributes_count is one (1) and the sub-attribute follows the count. The format of the COM.TexasInstruments.JITLocalBindings attribute is:

```
COM.TexasInstruments.JITLocalBindings {
  u2 attribute_name_index;
  u4 attribute_length;        /* variable length */
  u2 locals_count;
  {
  u1 segment;                 /* 0 - register binding   */
                              /* 1 - stack binding      */
  u2 offset;                  /* register number if register class */
                              /* frame pointer or stack pointer    */
                              /* offset if stack binding.          */
  u2 start_pc;                /* bytecode pc where binding starts */
  u2 end_pc;                  /* bytecode pc where binding ends   */
  } local_bindings_table[locals_count];
}
```

Here, the local_bindings_table includes an entry for each local variable. Other attributes that are used in a similar fashion include:

COM.TexasInstruments.JITLoopInfo

COM.TexasInstruments.JITCallsBelowInfo

COM.TexasInstruments.JITTypeInfo etc.

The COM.TexasInstruments.JITLoopInfo attribute defines for the code interpretive runtime system information relating to processing loops in the code. The information includes loop boundaries via intermediate code addresses, the nesting of a particular loop, whether or not the loop includes calls, and potentially, the kind of loop (i.e., is this an iterator loop). The loop boundary information is helpful in that the only other way to detect loops in intermediate code is with the aid of a flowgraph. The other information is useful in producing code that, for example, uses special overhead hardware loops which are available on most digital signal processing (DSP) chips.

The COM.TexasInstruments.JITCallsBelowInfo attribute provides information to the code interpretive runtime system to indicate whether native code generated from the intermediate code will include calls. This information is then used, for example, to determine whether parameters passed in registers should be left in those registers for the duration of execution of the related routine. Typically, if there are calls made by the routine, answer is no in that the registers are needed to pass parameter information to the callee routines.

The COM.TexasInstruments.JITCallsTypeInfo attribute provides information resulting from tracking class types of various variables and stack slots in the intermediate code. For example, tracking types provide information that indicates that the object associated with a 'invokevirtual' (call virtual method) instruction is of type 'MyClass'. Therefore, code is generated which directly calls the routine 'MyClass' rather than code which calls a routine via a dispatch table. In addition, general information relating to local variables and stack slots in the intermediate code can also be provided. Information indicating, for example, that an object associated with a 'getfield' instruction will never be NULL, therefore, bypass the null pointer check in the generated native code for this particular 'getfield' instruction. Additionally, information indicating, for example, that an array object associated with an 'iaload' (load integer from array) instruction is known to always have legal bounds for this particular 'iaload', therefor bypass the bounds check in the generated native code.

Other optimization information passed includes a fully annotated flowgraph or common sub-expression information useful in cases where a certain object's fields or methods are repeatedly accessed or invoked. Note also that the given optimization information can be either target dependent or target independent and used to create one or more sets of optimization attributes.

The code preparation system 12 also passes directions to the code interpretive runtime system in addition to passing optimization information. These directions are usually relating to optimizations that must be done on generated native code as opposed to being done on intermediate code. Thus, for example, directions can be given to the JIT compiler to perform instruction scheduling and peephole optimizations as described hereinabove in the description of the COM.TexasInstruments.JITOptimizations attribute. The following example shows how both optimizations and directions can be passed by the JIT.

```
COM.TexasInstruments.JIT {
  u2 attribute_name_index;
  u4 attribute_length;                    /* 2 + size of        */
                                          /* COM.TexasInstruments.JITOptimizations + */
                                          /* COM.TexasInstruments.JITLocalBindings */
  u2 attributes_count;                    /* 2 */
    attribute_info attributes[attributes_count];
                                          /* COM.TexasInstruments.JITOptimizations */
                                          /* COM.TexasInstruments.JITLocalBindings */
}
```

The COM.TexasInstruments.JIT attribute thus includes both the COM.TexasInstruments.JITOptimizations sub-attribute and the COM.TexasInstruments.JITLocalBindings sub-attribute.

Returning to decision block 56, if the user chooses not to perform AOT optimization analysis, operation continues at decision block 60 where the user has the option of providing alternate set or sets of intermediate code to the code interpretive runtime system. Note that some pre-analysis by the code analyzer 36 may be required to make the decision. If, at decision block 60, the option to provide alternate set or sets of intermediate code is selected, operation continues at block 62 where the code preparation system 12 generates the alternate intermediate code sets. Alternate sets of intermediate codes are generated, for example, for a given method where certain calls have been inlined, or similarly, an alternate set of intermediate code where certain loops in the method have been unrolled. Although the original intermediate code could itself be changed, by providing an alternate stream of intermediate code, the code interpretive runtime system is provided with the option of ignoring the alternate stream if, for example, resources are low.

Once the alternate set or sets of intermediate code are generated at block 62, processing continues at decision block 63 where, if necessary, the code analyzer 36 is invoked at block 58 to analyze the alternate intermediate code. Otherwise, processing continues at block 48 where the associated attribute information is then generated.

As an example, the attribute COM.TexasInstruments.AlternateCode is used to pass alternate set or sets of intermediate code to the interpreter of the code interpretive runtime system. This attribute is part of a method_info structure which is part of a class file (the same structure in which the predefined Code attribute is attached). The attribute is defined as follows:

```
COM.TexasInstruments.AlternateCode {
  u2 relative_importance;
  . . .
    . . . same fields as predefined Code attribute . . .
  . . .
}
```

The relative_importance field specifies the importance of this method relative to the entire application. Using this value, the JVM then determines whether to use the alternate set or sets of intermediate code or to ignore them. The runtime system ignores the alternate set or sets of intermediate code if, for example, resources (mainly space in this case) are running low.

Note that a single method info structure can include multiple COM.TexasInstruments.AlternateCode attributes. Also, note that this new attribute may also include the COM.TexasInstruments.JIT attribute (and hence any of its sub-attributes). This is beneficial in cases where the intermediate code is originally interpreted and then JIT compiled after too many interpretations.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of providing optimization information to a code interpretive runtime environment operating on a first data processing platform, comprising the steps of:

accepting as input intermediate code on a second data processing platform;

analyzing said intermediate code on said second data processing platform;

generating instructions on said second data processing platform for optimizing said intermediate code in response to said analyzing step;

providing said intermediate code and said instructions to the code interpretive runtime environment operating on the first data processing platform, the code interpretive runtime environment operable to use said instructions to execute said intermediate code on the first data processing platform.

2. A method of providing information to optimize execution in a code interpretive runtime system executable on a particular computer platform, the code interpretive runtime system having a particular configuration, the method comprising the steps of:

translating input code into an intermediate code executable on the code interpretive runtime system;

performing optimization analysis on said intermediate code;

generating a plurality of optimization levels in accordance with results of said optimization analysis; and providing said plurality of optimization levels to the code interpretive runtime system, the code interpretive runtime system operable to selectively implement at least one of said levels of optimization in accordance with the particular configuration of the code interpretive runtime system and the particular computer platform on which the code interpretive runtime system executes as part of executing said intermediate code.

3. The method of claim 2 wherein said providing step includes the step of providing said plurality of optimization levels to code interpretive runtime system as attributes in a class file.

4. The method of claim 2 further including the steps of:

generating at least one alternative set of code to said intermediate code; and providing said at least one alternative set of code to the code interpretive runtime system, the code interpretive runtime system further operable to selectively execute said at least alternative set of code instead of executing said intermediate code.

* * * * *